(12) United States Patent
Parker et al.

(10) Patent No.: US 11,441,597 B2
(45) Date of Patent: Sep. 13, 2022

(54) SOCKET ASSEMBLY WITH A PRESSED COVER PLATE AND METHOD OF CONSTRUCTION THEREOF

(71) Applicant: FEDERAL-MOGUL MOTORPARTS LLC, Southfield, MI (US)

(72) Inventors: Glen C. Parker, Saint Peters, MO (US); Brennan Sugg, Saint Louis, MO (US); Andrew Dickherber, Ofallon, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 186 days.

(21) Appl. No.: 16/507,686

(22) Filed: Jul. 10, 2019

(65) Prior Publication Data

US 2020/0018347 A1 Jan. 16, 2020

Related U.S. Application Data

(60) Provisional application No. 62/697,467, filed on Jul. 13, 2018.

(51) Int. Cl.
*F16C 11/06* (2006.01)
*B60G 7/00* (2006.01)

(52) U.S. Cl.
CPC ........ *F16C 11/0685* (2013.01); *F16C 11/068* (2013.01); *F16C 11/0642* (2013.01); *B60G 7/005* (2013.01); *B60G 2204/416* (2013.01)

(58) Field of Classification Search
CPC . F16C 11/0642; F16C 11/0647; F16C 11/068; F16C 11/0685; F16C 11/06–86;
(Continued)

(56) References Cited

U.S. PATENT DOCUMENTS 3,269,758 A * 8/1966 Ulderup ................ F16C 11/068
403/36
3,389,928 A * 6/1968 Wehner ............... F16C 11/0647
403/36
(Continued)

FOREIGN PATENT DOCUMENTS

CN 2700184 Y 5/2005
FR 1407330 A * 7/1965 ............. B60G 7/005
(Continued)

OTHER PUBLICATIONS

"Grease & Lubrication Fittings" Aetna Screw Products Col, Oct. 9, 2016, [online], [retrieved on Oct. 15, 2021] Retreived from the Internet, 3 pages <URL:https://www.aetnascrew.com/lubrication-grease-fittings.html (Year: 2016).*
(Continued)

*Primary Examiner* — Josh Skroupa
*Assistant Examiner* — Kevin J Baynes
(74) *Attorney, Agent, or Firm* — Robert L. Stearns; Dickinson Wright, PLLC (57) ABSTRACT

A ball socket assembly and method of construction thereof is provided. The ball socket assembly includes a housing having an inner surface surrounding an inner bore. The inner bore extends from an open first end to an open second end. A groove extends into the inner surface adjacent the second end. A ball stud having a ball portion is disposed in the inner bore with a shank portion of the ball stud extending through the open first end. A cover plate assembly is fixed to the housing. An outer piece of the cover plate assembly has an outer periphery and a through opening. The outer periphery is fixed in the groove. An inner piece of the cover plate assembly is fixed in the through opening. The inner piece includes an opening configured for receipt of a lubricant fitting.

22 Claims, 9 Drawing Sheets

(58) Field of Classification Search
CPC ........... F16C 11/106; Y10T 403/32729; Y10T 403/32737; Y10T 403/32745; Y10T 403/32754; Y10T 403/32762; Y10T 403/32811; B60G 2204/416; B60G 7/005
See application file for complete search history.

(56) References Cited

U.S. PATENT DOCUMENTS

| | | | | |
|---|---|---|---|---|
| 3,791,748 | A * | 2/1974 | Goodrich, Jr. | F16C 11/0647 403/27 |
| 3,813,178 | A * | 5/1974 | Herbenar | F16C 11/0647 403/27 |
| 3,960,457 | A * | 6/1976 | Gaines | G01N 3/56 403/27 |
| 4,111,571 | A | 9/1978 | Farrant | |
| 4,358,211 | A * | 11/1982 | Goodrich, Jr. | F16C 11/086 403/27 |
| 4,576,499 | A * | 3/1986 | Smith | F16C 11/0671 403/138 |
| 4,626,121 | A * | 12/1986 | Tajima | F16C 11/086 116/208 |
| 5,538,275 | A * | 7/1996 | Lomnick | B60G 7/005 277/635 |
| 5,655,848 | A * | 8/1997 | Catron | F16C 11/0604 403/137 |
| 5,676,485 | A * | 10/1997 | Lee | F16C 11/0642 277/635 |
| 6,152,637 | A | 11/2000 | Maughan | |
| 6,202,280 | B1 | 3/2001 | Parker | |
| 2005/0235476 | A1 * | 10/2005 | Spence | F16C 11/086 29/446 |
| 2006/0029461 | A1 * | 2/2006 | Benick | F16C 11/0647 403/122 |

FOREIGN PATENT DOCUMENTS

| | | | | |
|---|---|---|---|---|
| FR | 2365054 A1 | 4/1978 | | |
| GB | 1336087 A * | 11/1973 | .......... | F16C 11/0642 |
| JP | 60208622 A * | 10/1985 | .......... | F16C 11/0642 |

OTHER PUBLICATIONS

International Search Report, dated Oct. 14, 2019 (PCT/US2019/041330).

* cited by examiner

SOCKET ASSEMBLY WITH A PRESSED COVER PLATE AND METHOD OF CONSTRUCTION THEREOF

CROSS-REFERENCE TO RELATED APPLICATION

This application claims the benefit of U.S. Provisional Application Ser. No. 62/697,467, filed Jul. 13, 2018, which is incorporated herein by reference in its entirety.

BACKGROUND OF THE DISCLOSURE

1. Field

The present invention is related generally to a ball socket assembly, such as of the type for use in vehicle suspension and steering assemblies.

2. Related Art

Ball socket assemblies, also referred to as ball joints, are commonly employed in vehicle suspension and steering assemblies to allow two components (such as a control arm and a knuckle, for example) to articulate, pivot and/or rotate relative to one another during operation of the vehicle. Such ball socket assemblies typically include a housing that is fixedly attached with one of the components and a ball stud that is fixedly attached with the other component. The ball stud typically has a ball portion that is received in an inner bore of the housing and a shank portion which projects out of the housing.

A closing feature is generally employed to capture the ball portion of the ball stud, one or more bearings, and a preload device in the inner bore of the housing. In some ball socket assemblies, the closing feature is provided by a deformed end of the housing (such as through swaging or crimping the end of the housing). In other ball joints, the components are inserted into the inner bore through an open end of the housing, and the closing feature is provided via a cover plate that is employed to close that open end. Such cover plates are known to be fixedly attached with the housing via threading the cover plate to the housing or by pressing (i.e., flattening) the cover plate from a frustoconical shape to a flattened shape, thereby causing the cover plate to expand radially such that an outer periphery of the cover plate becomes fixedly seated within a groove that is pre-formed in the inner bore of the housing.

Although the above ball joint assemblies can prove effective in use, some problems can be encountered, particularly as a result of their construction and method of construction. For example, with press-in cover plates, problems can arise due to the formation of an opening to accommodate a grease fitting typically incorporated for injecting lubricant into the inner bore of the housing. In some cases, a pin (plug) is inserted into a pre-formed opening in the cover plate and held in the pre-formed opening during the pressing operation to maintain the size of the pre-formed opening as the cover plate is pressed and flattened. Then, a grease fitting with self-tapping threads is threaded into the pre-formed opening. However, grease fittings with self-tapping threads come at a high cost relative to conventional grease fittings not having self-tapping threads, and further yet, self-tapping grease fittings are typically more difficult and complex to install, thereby adding to the cost of manufacture. Then, in another example, in order to avoid the aforementioned problems associated with pre-formed openings and self-tapping grease fittings, it is known to tap an opening after the cover plate has been flattened. However, this process not only requires an additional costly tapping step in manufacture, but also results in the formation of loose metal shavings with a risk of leaving at least some of the metal shavings inside the inner bore.

SUMMARY OF THE DISCLOSURE

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

It is an object of the present disclosure to provide a ball socket assembly that overcomes disadvantages of known ball socket assemblies.

It is a further object of the present disclosure to provide a method of constructing a ball socket assembly that overcomes disadvantages of known methods of constructing ball socket assemblies.

It is a further object of the present disclosure to provide a ball socket assembly that is economical in manufacture and assembly and that exhibits a long and useful life.

In accordance with these objectives, as well as others, which will be appreciated by those possessing ordinary skill in the art of ball socket assemblies, the present disclosure is directed to providing a ball socket assembly for a motor vehicle and to a method of construction thereof.

In accordance with one aspect, the present disclosure is directed to a ball socket assembly which advances the art and improves upon currently known ball socket assemblies for motor vehicles.

In another aspect, the present disclosure is directed to a method of construction of a ball socket assembly which advances the art and improves upon currently known methods of construction for ball socket assemblies for motor vehicles.

In accordance with these and other objects, advantages, and aspects, a ball socket assembly is provided including a housing having an inner surface surrounding an inner bore, with the inner bore extending from an open first end to an open second end, and with a groove extending into the inner surface adjacent the second end. At least one bearing surface is provided in the inner bore. A ball stud having a ball portion is disposed in the inner bore in engagement with the at least one bearing surface and a shank portion of the ball stud extends through the open first end. The ball socket assembly further includes a cover plate assembly having an outer piece and an inner piece. The outer piece is provided having an outer periphery and a through opening, with the outer periphery being fixed in the groove and the inner piece being fixed in the through opening of the outer piece. The inner piece includes an opening, such as a central opening, configured for receipt of a lubricant fitting.

In accordance with another aspect, the inner piece is made of a first material and the outer piece is made of a second material, wherein the first material is harder than the second material. The relative increase in hardness of the inner piece facilitates assembly while preventing the inner piece from becoming damaged or otherwise distorted during assembly, and thus, facilitates forming a lubrication tight seal between the lubricant fitting and the inner piece.

In accordance with another aspect, the central opening in the inner piece can be threaded to facilitate threading the lubricant fitting into the central opening.

In accordance with another aspect, the inner piece can be provided having a cylindrical portion fixed in the through opening of the outer piece and a flange portion configured to overly an upper surface of the outer piece.

In accordance with another aspect, at least one grip feature can be provided extending radially outwardly from the cylindrical portion of the inner piece, with the grip feature being embedded into the outer piece to facilitate maintaining the inner piece in fixed, seal relation with the outer piece.

In accordance with another aspect, the at least one grip feature can include a pair of grip features spaced axially from one another.

In accordance with another aspect, the at least one grip feature can be provided as an annular protrusion, thereby established a full circumferential seal and locked engagement with the outer piece.

In accordance with another aspect, the ball socket assembly can further include at least one bearing disposed in the inner bore and a preload member sandwiched between the outer member and the at least one bearing in axially compressed, preloaded relation between the bearing and the outer member.

In accordance with another aspect, the outer periphery of the outer piece can be fixed in an interference fit within the groove of the housing and the inner piece can be fixed in an interference fit within the through opening of the outer piece, wherein the interference fit negates the need to incorporated secondary fixation and/or secondary sealing mechanisms.

In accordance with another aspect, a method of constructing a socket assembly is provided. The method includes the steps of: providing a housing having an inner surface which surrounds an inner bore and having a groove formed in the inner surface and a shoulder extending radially inwardly from the groove; inserting a portion of a ball stud into the inner bore of the housing; providing a cover plate assembly having an inner piece disposed into a through opening of a frusto-conically shaped outer piece; inserting the cover plate assembly at least partially into the inner bore and resting the outer piece on the shoulder; and pressing the cover plate assembly with a force directed toward the inner bore and causing an outer periphery of the outer piece to expand radially outwardly into fixed relation within the groove and causing the through opening of the outer piece to contract into fixed relation with the inner piece.

In accordance with another aspect, the method includes providing the inner piece being made of a first material and providing the outer piece being made of a second material, wherein the first material is harder than the second material.

In accordance with another aspect, the method can include providing the housing having an annular lip forming an upper surface of the groove with the annular lip having an inner diameter and providing the outer periphery of the outer piece having an outer diameter that is less than the inner diameter prior to pressing the cover plate assembly, thereby facilitating insertion of the cover plate assembly into the housing in clearance relation therewith prior to performing the pressing operation.

In accordance with another aspect, the method includes plastically deforming the outer piece while pressing the cover plate assembly and permanently increasing the outer diameter of the outer piece so that the outer diameter is greater than the inner diameter of the annular lip, thereby permanently fixing and locking the cover plate assembly to the housing.

In accordance with another aspect, the method can include providing the inner piece having a generally cylindrical portion inserted into the through opening of the frusto-conically shaped outer piece with the through opening of the outer piece having an inner diameter that is equal to or greater than the outer diameter of the generally cylindrical portion prior to pressing the cover plate assembly.

In accordance with another aspect, the method can include plastically deforming the outer piece while pressing the cover plate assembly and permanently decreasing the inner diameter of the through opening of the inner piece so that the inner diameter is less than the outer diameter of the generally cylindrical portion, thereby permanently fixing and locking the outer piece to the inner piece.

In accordance with another aspect, the method can include providing the generally cylindrical portion of the inner piece having at least one radially outwardly extending protrusion and embedding the at least one protrusion into an inner surface of the outer piece surrounding the through opening while pressing the cover plate assembly, thereby assuring a reliable, sealed fixation of the inner piece to the outer piece.

In accordance with another aspect, the method can include providing the inner piece having a central opening and inserting a grease fitting into the central opening.

In accordance with another aspect, the method can include providing the central opening having internal threads and providing the grease fitting having external threads and threading the grease fitting into the central opening.

In accordance with another aspect, the method can include inserting the grease fitting into the central opening after pressing the central plate assembly.

BRIEF DESCRIPTION OF THE DRAWINGS

These and other objects, features and advantages of the invention will become more readily appreciated when considered in connection with the following description of the presently preferred embodiments, appended claims and accompanying drawings, in which:

DETAILED DESCRIPTION OF AN EXAMPLE EMBODIMENT

Figure 1:
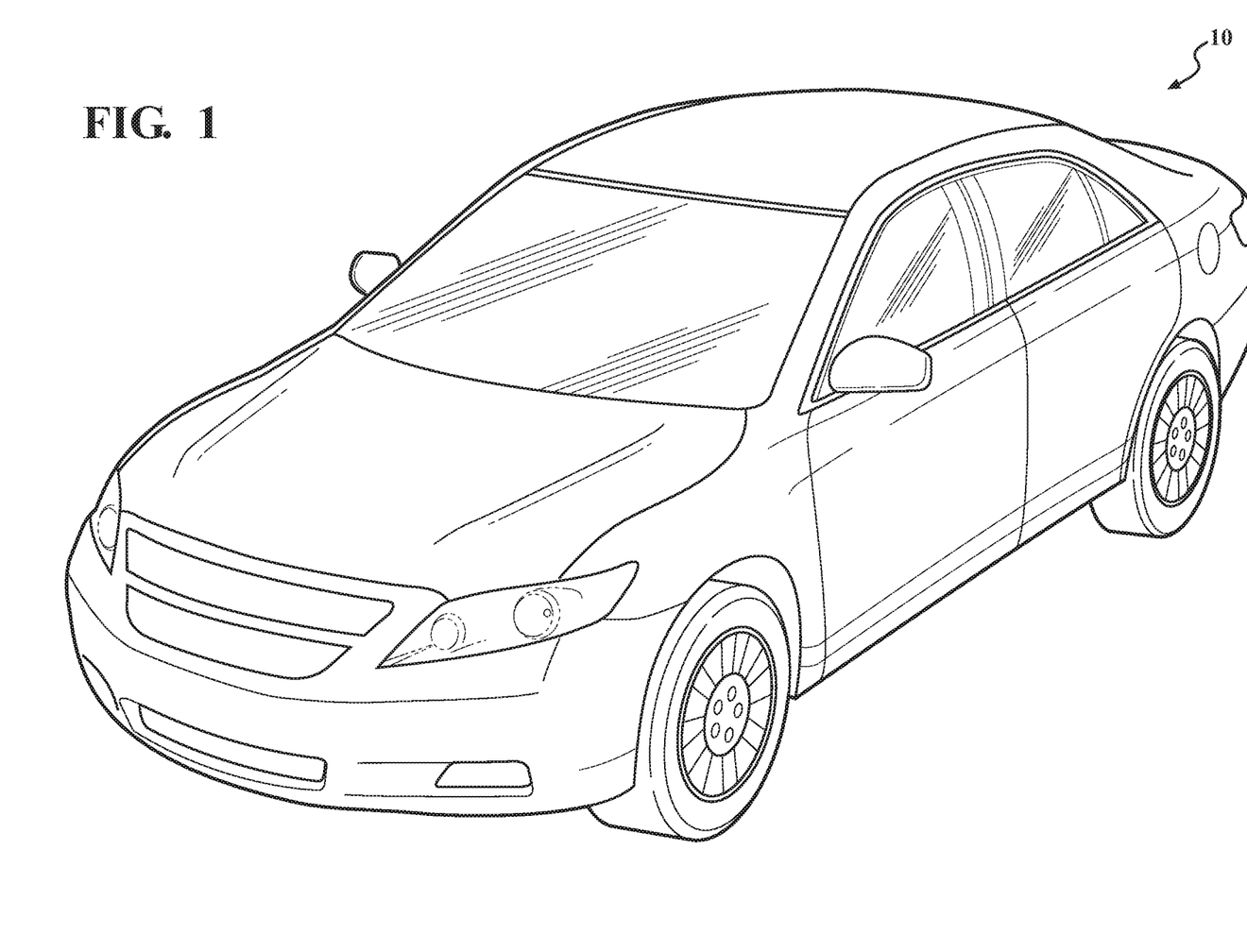
FIG. 1 is a perspective view of motor vehicle including one or more ball socket assemblies constructed in accordance with the disclosure.
Figure 1A:
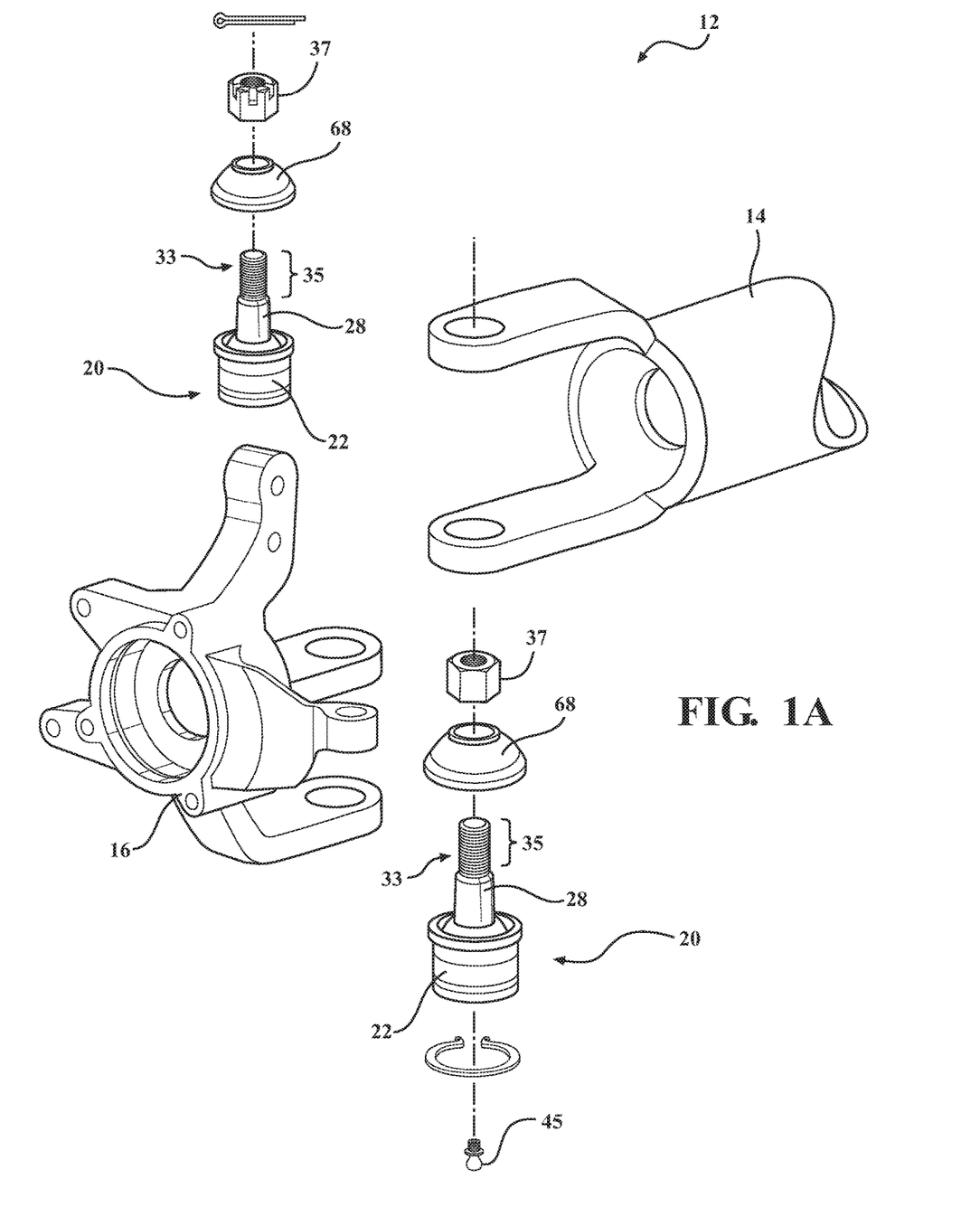
FIG. 1A illustrates exploded partial views of various vehicle suspension components wherein a ball socket assembly constructed in accordance with the disclosure may be used, with a knuckle illustratively shown including a pair of ball socket assemblies constructed according to one aspect of the disclosure.

Referring to the Figures, wherein like numerals indicate corresponding parts throughout the several views, unless otherwise stated, a motor vehicle 10 is shown in FIG. 1, wherein the motor vehicle 10 has at least one ball joint, also referred to as socket assembly or ball socket assembly 20 constructed in accordance with one aspect of the disclosure incorporated into a vehicle suspension and/or steering component thereof, such as in one or more components of an axle assembly 12, such as an assembly 12 including an axle 14 and/or a knuckle 16 that supports a wheel hub (not shown) for rotation therewith. It is to be recognized that the axle assembly 12 and knuckle 16 illustrated in FIG. 1A are not necessarily from a common vehicle, and that the illustration is provided merely to show potential uses for the ball socket assembly 20, such as in various components of a vehicle suspension and/or steering component. A pair, by way of example and without limitation, of the ball socket assemblies 20 operably attach, also referred to as couple, the knuckle 16 with the axle 14, such as shown or a different configuration of an axle, for relative pivotal movement thereto. As explained in further detail hereafter, the ball socket assembly 20 and the method of construction thereof overcomes disadvantages of known ball socket assemblies and methods of construction thereof, such as those discussed above, as will become readily understood by one possessing ordinary skill in the art of ball socket assemblies.

Figure 2:
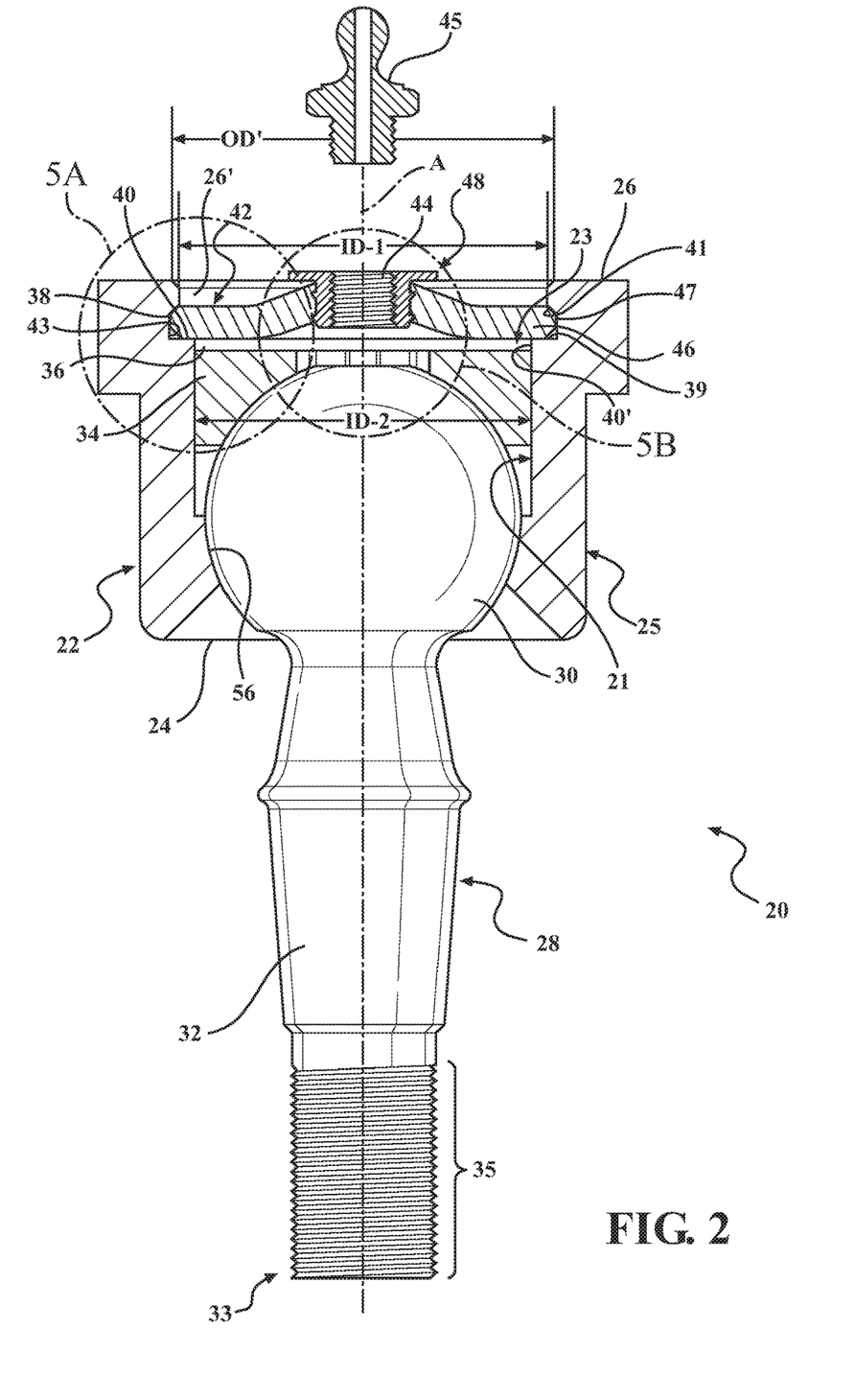
FIG. 2 is a cross-sectional view of an exemplary embodiment of an assembled ball socket assembly constructed according to one aspect of the present disclosure.

Now referring to FIG. 2, the ball socket assembly 20 includes a housing 22 with an inner surface 21 surrounding an inner bore 23 that extends along a central axis A from an open first end 24 to an open second end 26. In the exemplary embodiment, the housing 22 is of a cartridge-style construction in that it has an outer surface 25, such as a cylindrical outer surface, which is designed to be press-fit into a similarly shaped opening of another component, such as a control arm (not shown), by way of example and without limitation. However, it is to be understood that the housing 22 could alternately be integrally formed with the other component. The housing 22 is preferably made as a single piece of metal, such as steel or an alloy steel, and may be formed through any suitable process or combination of processes, including casting, forging, and machining.

The ball socket assembly 20 also includes a ball stud 28 with a spherical ball portion 30 and a shank portion 32. The ball studs 28 are shown aligned with one another along a common vertical axis to allow the knuckle 16 to pivot relative to the axle 14 about the vertical axis in response to a steering input from a driver of the vehicle. The ball portion 30 is inserted in the inner bore 23 of the housing 22, and the shank portion 32 extends from the ball portion 30 out of the housing 22 through the open first end 24 to an attachment end 33. To facilitate attachment of attachment end 33 to a vehicle component, such as, for example, to a control arm, attachment end 33 is shown as having an externally threaded region 35 configured for threaded attachment of a nut 37. The ball stud 28 is preferably made as a single piece of metal, such as steel or an alloy steel, and may be formed through any suitable process or combination of processes, including casting, forging, and machining.

A bearing 34 is shown disposed in the housing 22 adjacent the open second end 26 and has a curved bearing surface, such as a concave semi-spherical surface, which is in mating contact with the ball portion 30 of the ball stud 28 to allow the ball stud 28 and housing 22 to articulate and rotate relative to one another, as desired. The bearing 34 is preferably made of a suitable bearing grade plastic or metal and may be formed through any suitable process or combination of processes. It will be appreciated by one possessing ordinary skill in the art that other bearing arrangements are possible, including having multiple bearings spaced axially from one another for engagement with opposite hemispheres of the ball portion 30, by way of example and without limitation. A preload member 36, such as a spring member, e.g. washer spring, sometimes referred to as a Belleville washer, can also be disposed in the inner bore 23 to minimize or remove axial play, sometimes referred to as slop, between the ball portion 30 and the bearing 34. In the non-limiting embodiment illustrated, the preload member 36 is shown in direct contact with the bearing 34 on an opposite side of the bearing 34 from the ball stud 28 for preloading the curved bearing surface against the ball portion 30 of the ball stud 28. It is to be understood that the preload member 36 could be spaced from the bearing 34 and maintained in operable communication therewith to maintain the desired preload via one or more intermediate washers or the like, if desired. The preload member 36 also allows the bearing 34 and the ball stud 28 to deflect, or move concurrently with one another, in an axial direction, thereby acting to dampen shock loads throughout the ball socket assembly 20. Although only one preload member 36 is included in the non-limiting exemplary embodiment, it is to be understood that the ball socket assembly 20 could alternately include two or more bearings.

Figure 5A:
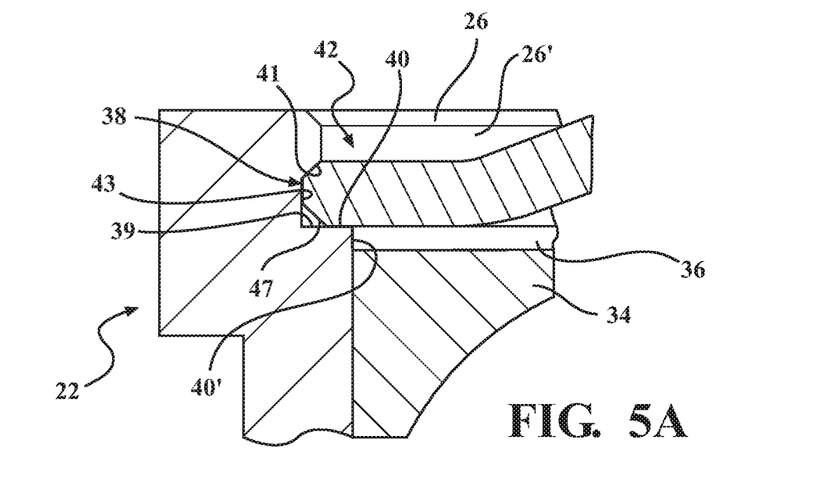
FIG. 5A is an enlarged cross-sectional view of an encircled area 5A of FIG. 2.

Adjacent the open second end 26, a groove 38 extends radially outward into the inner surface 21 of the housing 22, wherein the groove 38 can be formed as an annular groove extending circumferentially three hundred and sixty degrees (360°) around the central axis A. The groove 38 has a lower surface 39, an upper surface 41, and a sidewall 43 extending between the upper and lower surfaces 39, 41, wherein the upper and lower surfaces 39, 41 and generally parallel to one another. The lower surface 39 extends radially inwardly from the groove 38 to define an exposed shoulder 40 (exposed meaning that the shoulder 40 can be seen looking downwardly along the axis A as viewed in FIG. 2). As such, as best shown in FIG. 5A, the shoulder 40 extends radially inwardly further than and beyond the upper surface 41, wherein the upper surface 41 of the groove 38 is defined by an overhanging annular lip 26' defined in part by the second end 26 of the housing 22. Accordingly, the annular lip 26' has an inner diameter ID-1, while the shoulder 40 and an inner edge 40' of the shoulder 40 has an inner diameter ID-2, wherein the inner diameter ID-2 is less than the inner diameter ID-1 of the lip 26' of the open second end 26 of the housing 22.

A cover plate assembly 42 is received and fixed in the groove 38 to close the second end 26 of the housing 22. The cover plate assembly 42 prevents the ingress of contamination into the inner bore 23 and captures the ball portion 30 of the ball stud 28, the bearing 34, and the preload member 36 within the inner bore 23, wherein upon fixation of the cover plate assembly 42 within the groove 38, the desired axial preload is automatically applied between the ball stud 28, the bearing 34, and the preload member 36. The cover plate assembly 42 has an central opening 44, wherein the central opening 44 is configured for releasably receiving a lubricant fitting 45 (also known as a Zerk fitting) for conveying a lubricant, such as grease, into the inner bore 23 during initial assembly and during routine maintenance of the ball socket assembly 20. To facilitate releasably receiving the grease fitting 45, the central opening 44 can be formed as a female threaded central opening 44, wherein the grease fitting 45 can be provided having external male threads sized for threaded receipt in the threaded central opening 44. If inserted after assembly of the cover plate assembly 42 to the housing 22, the relatively increased hardness of an inner piece 48 to an outer piece 46 prevents distortion of the central opening 44, thereby assuring insertion of the grease fitting 45 into the central opening 44 is easy and without complication. Accordingly, the central opening 44, and any female threads therein, if provided, are assured of retaining a round, cylindrical configuration for mating receipt of the grease fitting 45, and any male threads thereon, if provided.

Figure 3:
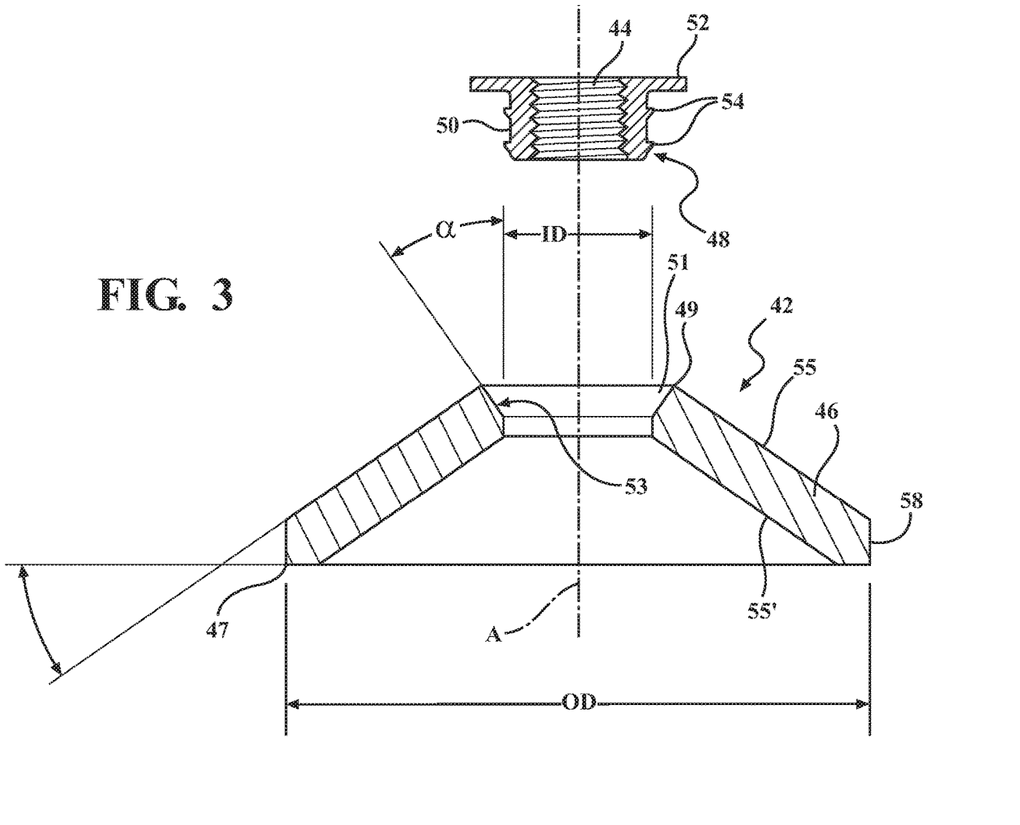
FIG. 3 is an exploded cross-sectional view of a cover plate assembly of the ball socket assembly of FIG. 2 showing an inner piece of the cover plate assembly prior to being assembled to an outer piece of the cover plate assembly.

Referring now to FIGS. 2 and 3, the cover plate assembly 42 includes two pieces that formed separately from one another as different pieces of material. Specifically, the cover plate assembly 42 includes the outer piece 46, also referred to as outer member, and the inner piece 48, also referred to as inner member. The inner piece 48 is preferably made of a first material and the outer piece 46 is made of a second material, wherein the first material of the inner piece 48 is harder than the second material of the outer piece 46. As best shown in FIGS. 2 and 3, the outer piece 46 is pre-formed with a frustoconical shape (i.e., it is shaped similar to a cone having a base, also referred to a bottom end 47, and a peak, also referred to as top end 49, with a frustum formed at a through opening 51 having an inner diameter ID at the top end 49). The bottom end 47, prior to the outer piece 46 being flattened, has an outer periphery 58 with an outer diameter OD that is less than the innermost diameter ID-1 of the open second end 26 of the housing 22 and which is greater than the inner diameter ID-2 of the shoulder 40. Accordingly, the shoulder 40 is assured of supporting the bottom end 47 thereon, and preventing the passage of outer piece 46 thereby. The through opening 51 has an inner surface 53 (FIG. 3) that is tapered radially outwardly, such that the inner surface 53 diverges at an angle α relative to the central axis A. The inner surface 53 is shown as extending generally transversely to generally parallel, planar surfaces, also referred to as faces 55, 55', of outer piece 46.

Figure 3A:
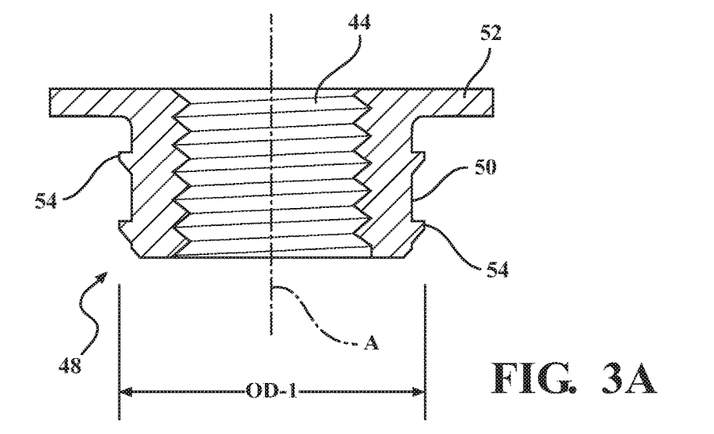
FIG. 3A is a cross-sectional view of the inner piece of the cover plate assembly of FIGS. 2 and 3.
Figure 3B:
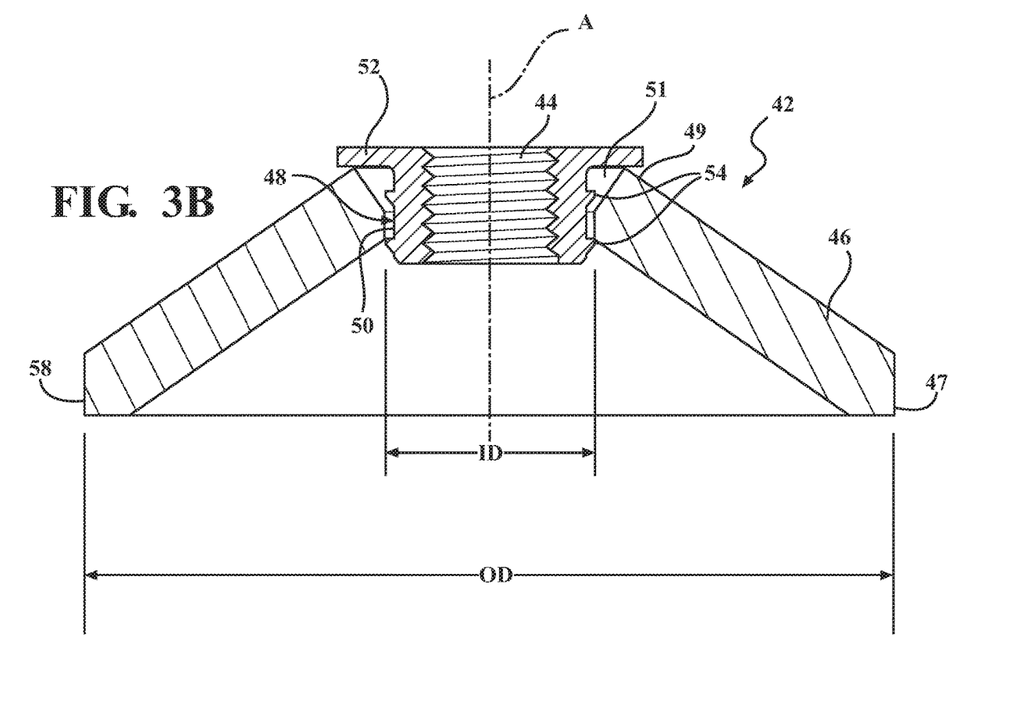
FIG. 3B is view similar to FIG. 3 showing the inner piece of the cover plate assembly assembled to the outer piece of the cover plate assembly, with the cover plate assembly shown in a pre-assembled state prior to being assembled to a housing of the ball socket assembly of FIG. 2.

As best shown in FIG. 3A, the inner piece 48 is pre-formed with a cylindrical body, also referred to as cylindrical portion 50, and a flange portion 52. The flange portion 52 extends radially outwardly from an upper end of the cylindrical portion 50. The threaded central opening 44 is formed extending along at least a portion of an inner surface of the cylindrical portion 50 and is shown as extending the full axial length of the inner piece 48. An outer surface of the cylindrical portion 50 is shown having a grip feature, with the grip feature being shown in a non-limiting embodiment as a pair of axially spaced barbs 54. The barbs 54 extend radially outwardly from the outer surface of cylindrical portion 50, wherein the barbs 54 can be formed as annular ribs, also referred to as protrusions 54, having an OD-1 that extend circumferentially around the entirety of the cylindrical portion 50 about central axis A. It is to be understood that the grip feature 54 could be a single grip feature or more than a pair, as shown.

Figure 4:
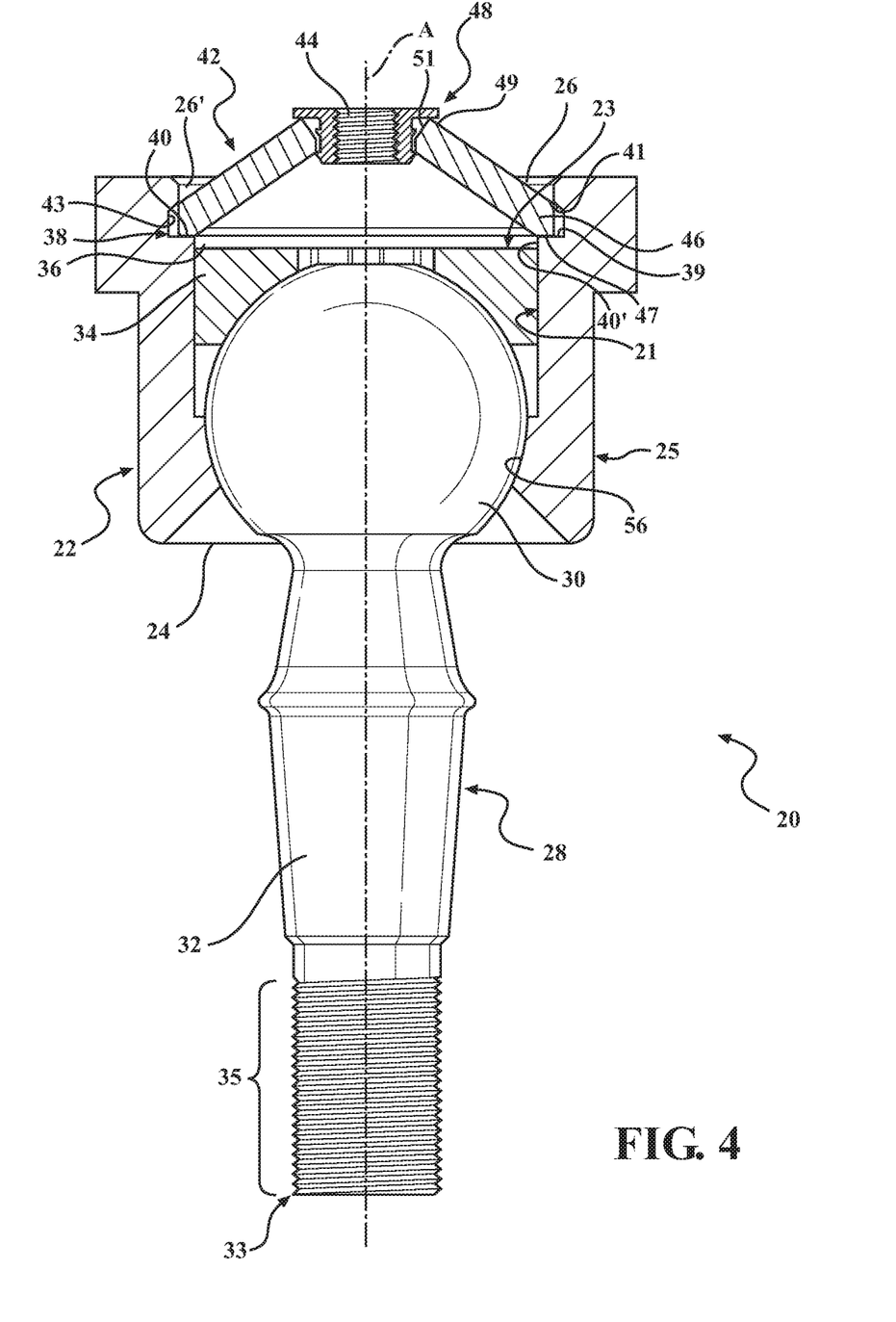
FIG. 4 is a view similar to FIG. 2 showing the cover plate assembly disposed into an inner bore of the housing, with the cover plate assembly shown prior to a pressing operation used to assemble the cover plate assembly to the housing of the ball socket assembly.
Figure 6:
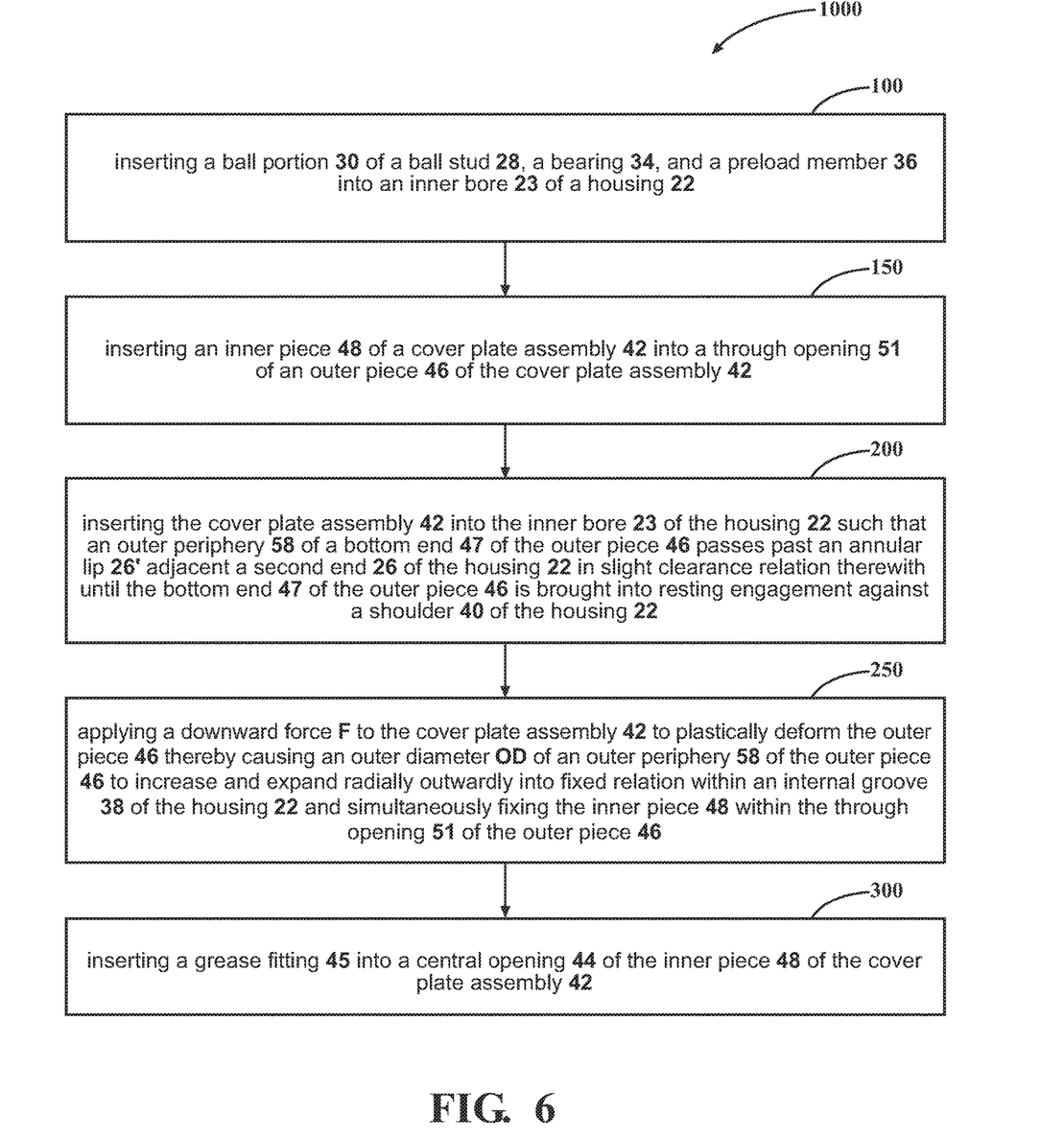
FIG. 6 is a flow diagram illustrating a method of constructing a ball socket assembly in accordance with another aspect of the disclosure.

As shown in FIG. 4 and as diagrammed in FIG. 6, a method 1000 of constructing and assembling the ball socket assembly 20 is provided. The method of construction and assembly of the ball socket assembly 20 begins at step 100 with inserting the ball portion 30 of the ball stud 28, the bearing 34, and the preload member 36 into the inner bore 23 of the housing 22. The ball stud 28 is extended through the open first end 24 and the ball portion 30 is brought into engagement with a bearing surface 56, shown in a non-limiting embodiment as being formed as a monolithic piece of the housing 22, though, the bearing surface 56 could be provided as a separate bearing that is brought into abutment with a support surface of the housing 22, such as a support surface fixed to the housing 22 (could be a shoulder formed as a monolithic piece with housing 22) or a separate support surface fixed to the housing 22, such as a snap ring (not shown) disposed in an annular groove (not shown) in housing 22. Next, at step 150, the inner piece 48 of the cover plate assembly 42 is inserted into the through opening 51 of the outer piece 46. The tapered inner surface 53 and the inner diameter ID of through opening 51, preferably being greater in diameter than the outer diameter OD-1 of cylindrical portion 50 (including the outer diameter of grip feature 54), allows the cylindrical portion 50 of the inner piece 48 to be more easily located and inserted with a slight clearance fit into the opening of the outer piece 46 with the flange portion 52 being brought into overlying engagement with the planar upper surface 55 of the outer piece 46. It is to be understood that a line-to-line or slight interference fit between cylindrical portion 50 and top end 49 is contemplate herein. Then, at step 200 the cover plate assembly 42 is inserted into the inner bore 23 of the housing 22 such that the outer periphery 58 of bottom end 47 passes past the annular lip 26' adjacent the second end 26 in slight clearance relation therewith until bottom end 47 of the outer piece 46 is brought into resting engagement against the shoulder 40.

Figure 4A:
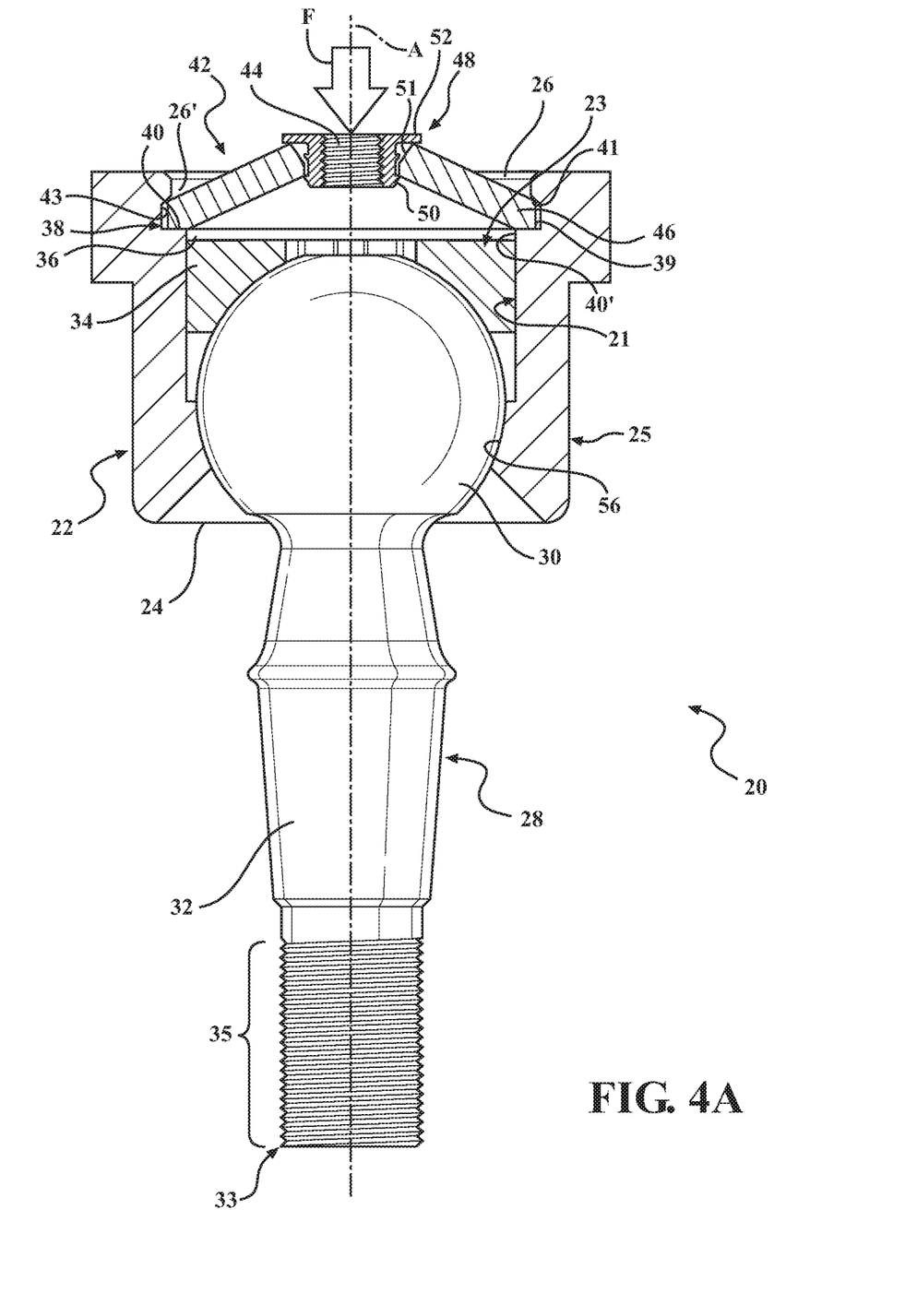
FIG. 4A is a view similar to FIG. 4 showing a force being applied to the cover plate assembly to assemble the cover plate assembly to the housing, with the cover plate assembly being shown in an intermediate state of assembly to the housing.

Then, at step 250, as depicted in FIG. 4A, a downward force F is then applied to the cover plate assembly 42 to plastically deform the outer piece 46. Since the inner piece 48 is made of a harder material than the outer piece 46, the downward force F can be concentrated on an upper surface of the flange portion 52 of inner piece 48 while the inner piece 48 resists deformation, thereby causing the outer diameter OD of the outer periphery 58 of the outer piece 46 to increase and expand radially outwardly into the groove 38 of the housing 22. The outer diameter OD of outer piece 46 continues to be expanded as the conical shape of outer piece 46 is generally flattened and as the outer piece 46 is plastically deformed until it is bought into fixed relation within the groove 38, such that an interference fit is formed between the outer periphery 58 of the outer piece 46. The interference fit can be formed between at least one of the outer periphery 58 and the cylindrical sidewall 43 of the groove 38 and/or between the outer periphery 58 and lower and upper surfaces 39, 41 of the groove 38. Upon plastically deforming the outer piece 46, the outer diameter OD is permanently increased to an OD' (FIG. 2) that is greater than the inner diameter ID-1 of the annular lip 26' adjacent the second end 26 of the housing 22. As such, the outer periphery 58 becomes permanently fixed in an interference fit within the groove 38 and thus, the cover plate assembly 42 becomes permanently fixed to the housing 22 due to the outer piece 46 becoming plastically deformed.

Figure 5B:
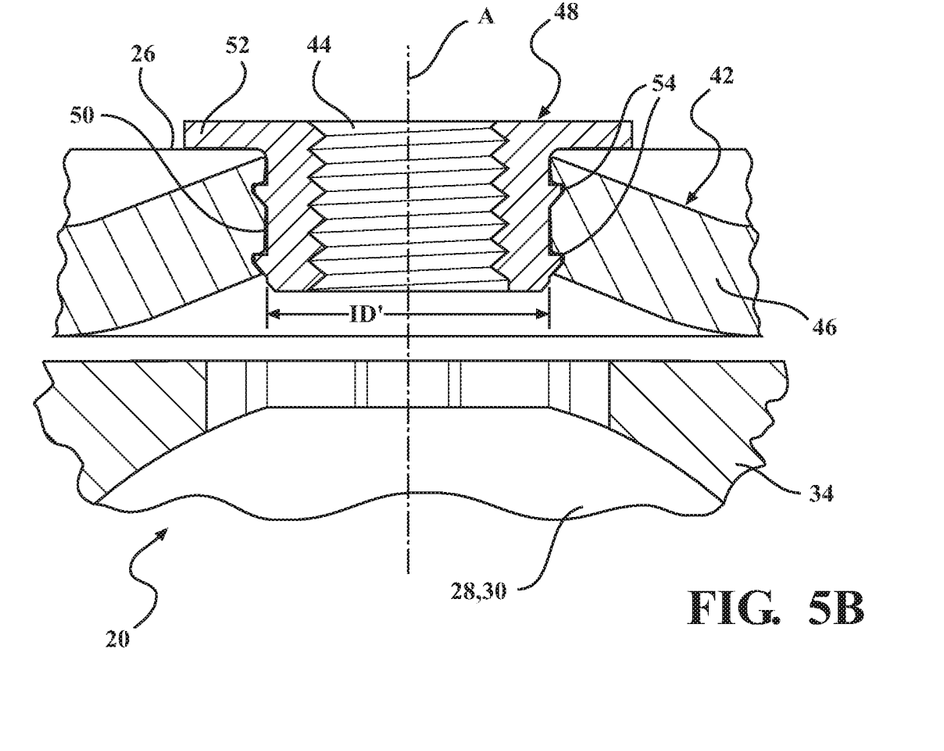
FIG. 5B is an enlarged cross-sectional view of an encircled area 5B of FIG. 2.

The radial expansion of the outer piece 46 causes simultaneous fixation of the inner piece 48 within the through opening 51 of the outer piece 46. As the bottom end 47 is caused to expand radially, the inner diameter ID of the through opening 51 of the outer piece 46 is caused to contract and plastically deform to a reduced diameter ID' (FIG. 5B), wherein ID' is less than the outer diameter OD-1 of the barbs 54 and cylindrical portion 50, thereby creating an interference fit between the inner surface 53 of the outer piece 46 and the grip feature 54 of the inner piece 48, wherein the grip feature 54 becomes embedded into the inner surface 53 of the outer piece 46. The respective interference fits established between the housing 22 and the outer piece 46, and between the outer piece 46 and the inner piece 48, not only permanently fix the outer piece 46 to housing 22 and the inner piece 48 to the outer piece 46, but also establishes a fluid tight seal between the housing 22 and the outer piece 46 and between the outer piece 46 and the inner piece 48. As such, lubrication, such as grease, is assured of remaining sealed within the inner bore 23. It is to be recognized that the barbs 54 on the inner piece 48 improve the strength of the interference fit between the outer and inner pieces 46, 48. Upon completion of the pressing process, the preload member 36 that is sandwiched between the outer piece 46 and the bearing 34 is caused to automatically impart the desire preload between the ball portion 30 and the bearing 34.

Then, at step 300, the grease fitting 45 and be inserted into the central opening 44 in reliable, easy fashion without complication, largely due to the inner piece 48 resisting deformation as a result of be constructed of a harder material relative to the outer piece 46, wherein the inner piece 48 can be formed of a hardened stainless steel or other hardened metal if desired. To facilitate assembly of the grease fitting 45 into the central opening 44, the central opening 44 can be provided having internal, female threads and the grease fitting 45 can be provided with external, male threads sized for mating threaded engagement with one another. Accordingly, the assembly can include threading the grease fitting 45 into the central opening 44 after pressing the cover plate assembly 42 into fixed attachment with the housing 22. Of course, it is contemplate herein that the grease fitting 45 can be preassembled within the central opening 44 prior to the pressing operation, if desired, wherein a pressing sleeve could be used having a clearance fit about the grease fitting to avoid damaging the greasing fitting 45 while pressing the cover plate assembly 42 and the outer piece 46 thereof into fixed attachment within the groove 38.

In some vehicles, the ball socket assembly 20 must be installed in very confined locations. The threads on the cover plate assembly 42 allow the grease fitting 45 to be removed before installation to reduce the axial size of the ball socket assembly 20 and then reinstalled with minimal effort. Also, after flattening, the cover plate assembly 42 has a very low axial profile such that it does not substantially increase the axial length of the ball socket assembly 20.

Obviously, many modifications and variations of the present invention are possible in light of the above teachings. It is to be understood that although the ball socket assembly 20 is depicted in a suspension/steering application of the motor vehicle 10, other applications within the motor vehicle 10 are contemplated herein, as well as other non-vehicular applications. Further yet, it is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A ball socket assembly, comprising:
   a housing having an inner surface surrounding an inner bore, said inner bore extending from an open first end to an open second end with a groove extending into said inner surface adjacent said second end;
   at least one bearing surface provided in said inner bore;
   a ball stud having a ball portion disposed in said inner bore in engagement with said at least one bearing surface and having a shank portion extending through said open first end; and
   a cover plate assembly having an outer piece and an inner piece, said outer piece having an outer periphery and a through opening, said outer periphery being fixed in said groove with an outer surface of said outer piece facing away from said ball portion, said inner piece having a central opening configured for receipt of a lubricant fitting and said inner piece having a flange portion extending outward of said through opening and engaging said outer surface of said outer piece, and said outer piece being plastically deformed into an interference fit with said inner piece.

2. The ball socket assembly of claim 1, wherein said inner piece is made of a first material and said outer piece is made of a second material, wherein the first material is harder than the second material.

3. The ball socket assembly of claim 1, wherein said central opening is threaded.

4. The ball socket assembly of claim 1, wherein said inner piece has a cylindrical portion fixed in said through opening.

5. The ball socket assembly of claim 4, further including at least one grip feature extending radially outwardly from said cylindrical portion, said grip feature being embedded into said outer piece.

6. The ball socket assembly of claim 5, wherein said at least one grip feature includes a pair of grip features spaced axially from one another.

7. The ball socket assembly of claim 5, wherein said at least one grip feature is an annular protrusion.

8. The ball socket assembly of claim 1, further including at least one bearing disposed in said inner bore and a preload member sandwiched between said outer piece and said at least one bearing.

9. The ball socket assembly of claim 1, wherein said outer periphery is fixed in an interference fit within said groove and said inner piece is fixed in an interference fit within said through opening.

10. A method of constructing a socket assembly, comprising the steps of:
    providing a housing having an inner surface which surrounds an inner bore and having a groove formed in the inner surface and a shoulder extending radially inwardly of the groove;
    inserting a portion of a ball stud into the inner bore of the housing;
    providing a cover plate assembly having an inner piece disposed into a through opening of a frusto-conically shaped outer piece;
    inserting the cover plate assembly at least partially into the inner bore and resting the outer piece on the shoulder; and
    pressing the cover plate assembly with a force directed onto to the inner piece of the cover plate assembly and toward the inner bore and causing an outer periphery of the outer piece to expand radially outwardly into fixed relation within the groove and causing the through opening of the outer piece to contract into fixed relation with the inner piece.

11. The method of claim 10, further including providing the inner piece being made of a first material and providing the outer piece being made of a second material, wherein the first material is harder than the second material.

12. The method of claim 10, further providing the housing having an annular lip forming an upper surface of the groove with the annular lip having an inner diameter and providing the outer periphery of the outer piece having an outer diameter that is less than the inner diameter prior to pressing the cover plate assembly.

13. The method of claim 12, further including plastically deforming the outer piece while pressing the cover plate assembly and permanently increasing the outer diameter of the outer piece so that the outer diameter is greater than the inner diameter of the annular lip.

14. The method of claim 13, further providing the inner piece having a generally cylindrical portion inserted into the through opening of the frusto-conically shaped outer piece with the through opening of the outer piece having an inner diameter that is equal to or greater than the outer diameter of the generally cylindrical portion prior to pressing the cover plate assembly.

15. The method of claim 14, further including plastically deforming the outer piece while pressing the cover plate assembly and permanently decreasing the inner diameter of the through opening so that the inner diameter is less than the outer diameter of the generally cylindrical portion.

16. The method of claim 15, further including providing the generally cylindrical portion having at least one radially outwardly extending protrusion and embedding the at least one protrusion into an inner surface of the outer piece surrounding the through opening while pressing the cover plate assembly.

17. The method of claim 10, further including providing the inner piece having a central opening and inserting a grease fitting into the central opening.

18. The method of claim 17, further including providing the central opening having internal threads and the grease fitting having external threads and threading the grease fitting into the central opening.

19. The method of claim 17, further including inserting the grease fitting into the central opening after pressing the cover plate assembly.

20. A ball socket assembly, comprising:
a housing having an inner surface surrounding an inner bore, said inner bore extending from an open first end to an open second end with a groove extending into said inner surface adjacent said second end;
at least one bearing provided in said inner bore adjacent said open second end;
a ball stud having a ball portion disposed in said inner bore in engagement with said at least one bearing and having a shank portion extending through said open first end; and
a cover plate assembly having an outer piece and an inner piece, said outer piece having an outer periphery and a through opening, said outer periphery being fixed in said groove, said inner piece being disposed adjacent to but axially spaced out of direct engagement with each of said ball portion and said at least one bearing and having a central opening configured for receipt of a lubricant fitting, and said outer piece being plastically deformed into an interference fit with said inner piece.

21. A ball socket assembly, comprising:
a housing having an inner surface surrounding an inner bore, said inner bore extending from an open first end to an open second end with a groove extending into said inner surface adjacent said second end, said groove having opposite surfaces axially spaced from one another by a sidewall of said groove;
at least one bearing surface provided in said inner bore;
a ball stud having a ball portion disposed in said inner bore in engagement with said at least one bearing surface and having a shank portion extending through said open first end; and
a cover plate assembly having an outer piece and an inner piece, said outer piece having an outer periphery and a through opening, said outer periphery being fixed in said groove and said outer piece engaging the opposite surfaces of said groove, said inner piece having a central opening configured for receipt of a lubricant fitting, and said outer piece being plastically deformed into an interference fit with said inner piece.

22. A ball socket assembly, comprising:
a housing having an inner surface surrounding an inner bore, said inner bore extending from an open first end to an open second end with a groove extending into said inner surface adjacent said second end;
at least one bearing surface provided in said inner bore;
a ball stud having a ball portion disposed in said inner bore in engagement with said at least one bearing surface and having a shank portion extending through said open first end;
a cover plate assembly having an outer piece and an inner piece, said outer piece having an outer periphery and through opening, said outer periphery being fixed in said groove, said inner piece having a central opening configured for receipt of a lubricant fitting, and said outer piece being plastically deformed into an interference fit with said inner piece, and
at least one preload member formed separately from and engaging said outer piece to impart a preload between said ball portion and said at least one bearing surface.

* * * * *